United States Patent
Marzani et al.

(10) Patent No.: US 8,527,485 B2
(45) Date of Patent: Sep. 3, 2013

(54) METHOD AND SYSTEM FOR PROCESSING INFORMATION RELATING TO A VEHICLE

(75) Inventors: Stefano Marzani, Reggio Emilia (IT); Francesco Lolli, Scandiano (IT); Lorenzo Fantesini, Reggio Emilia (IT)

(73) Assignee: RE:LAB S.R.L., Reggio Emilia (IT)

( * ) Notice: Subject to any disclaimer, the term of this patent is extended or adjusted under 35 U.S.C. 154(b) by 0 days.

(21) Appl. No.: 13/501,395

(22) PCT Filed: Oct. 12, 2010

(86) PCT No.: PCT/IB2010/054621
§ 371 (c)(1), (2), (4) Date: May 4, 2012

(87) PCT Pub. No.: WO2011/045750
PCT Pub. Date: Apr. 21, 2011

(65) Prior Publication Data
US 2012/0215754 A1   Aug. 23, 2012

(30) Foreign Application Priority Data
Oct. 12, 2009   (IT) .............................. TO2009A0779

(51) Int. Cl.
G06F 17/30   (2006.01)
(52) U.S. Cl.
USPC ........... 707/705; 707/815; 707/912; 370/465; 701/522; 701/533; 701/534; 701/501; 701/508
(58) Field of Classification Search
USPC ........... 707/705, 815, 912; 370/465; 701/29, 701/33, 200, 201, 208, 522, 533, 534, 501, 701/508
See application file for complete search history.

(56) References Cited

U.S. PATENT DOCUMENTS

| | | | | |
|---|---|---|---|---|
| 5,341,478 A * | 8/1994 | Travis et al. | ................. | 709/203 |
| 5,742,848 A * | 4/1998 | Burgess | ....................... | 719/315 |
| 6,006,147 A | 12/1999 | Hall et al. | | |
| 6,170,025 B1 * | 1/2001 | Drottar et al. | .................... | 710/48 |
| 6,233,611 B1 * | 5/2001 | Ludtke et al. | ................. | 709/223 |
| 6,449,541 B1 * | 9/2002 | Goldberg et al. | ............... | 701/36 |
| 6,526,340 B1 * | 2/2003 | Reul et al. | .................... | 701/29.3 |
| 6,571,140 B1 * | 5/2003 | Wewalaarachchi et al. | ..... | 700/83 |
| 6,718,425 B1 * | 4/2004 | Pajakowski et al. | .......... | 710/315 |
| 6,907,445 B2 * | 6/2005 | Pellegrino et al. | ............ | 709/201 |
| 7,188,026 B2 * | 3/2007 | Tzamaloukas | ................ | 701/522 |

(Continued)

FOREIGN PATENT DOCUMENTS

EP    1 349 024 A2    1/2003

OTHER PUBLICATIONS

International Search Report issued in PCT/IB2010/054621 dated Mar. 15, 2011.

*Primary Examiner* — Frantz Coby
(74) *Attorney, Agent, or Firm* — Workman Nydegger

(57) ABSTRACT

A system for processing information relating to a vehicle includes one or more electronic control units which can be connected to one another through a vehicle network. The system includes an electronic control device adapted to interface to and exchange data with the network and a nomadic device adapted to exchange data with the electronic device, wherein the electronic control device includes an automatic configuration module adapted to automatically detect parameters of the network so as to retrieve a network database of the vehicle. The network database includes the information required for properly interpreting the data circulating in the network.

21 Claims, 9 Drawing Sheets

(56) References Cited

U.S. PATENT DOCUMENTS

| | | |
|---|---|---|
| 2002/0070851 A1 | 6/2002 | Raichle et al. |
| 2002/0103583 A1* | 8/2002 | Ohmura et al. ............... 701/33 |
| 2002/0105968 A1* | 8/2002 | Pruzan et al. ............... 370/465 |
| 2002/0116103 A1* | 8/2002 | Matsunaga et al. ........... 701/29 |
| 2002/0161820 A1* | 10/2002 | Pellegrino et al. ............ 709/201 |
| 2004/0230373 A1* | 11/2004 | Tzamaloukas ............... 701/208 |
| 2005/0085953 A1* | 4/2005 | Hoenninger et al. ............ 701/1 |
| 2007/0271029 A1* | 11/2007 | Tzamaloukas ............... 701/200 |
| 2008/0288768 A1 | 11/2008 | Barowski et al. |

* cited by examiner

| Messages | | | | Signals | | | | |
|---|---|---|---|---|---|---|---|---|
| Name | ID | Transmitter node | Receiver node | Name | Start bit | Length | Offset | Scale factor |
| Msg 1 | MsgID1 | NodeX | NodeY, NodeW | Sig 1.1 | ... | ... | ... | ... |
| | | | | Sig 1.2 | ... | ... | ... | ... |
| | | | | Sig 1.3 | ... | ... | ... | ... |
| | | | | Sig 1.4 | ... | ... | ... | ... |
| | | | | ... | | | | |
| | | | | ... | | | | |
| | | | | Sig 1.n | ... | ... | ... | ... |
| Msg 2 | MsgID2 | NodeZ | NodeY | Sig 2.1 | ... | ... | ... | ... |
| | | | | Sig 2.2 | ... | ... | ... | ... |
| | | | | Sig 2.3 | ... | ... | ... | ... |
| | | | | Sig 2.4 | ... | ... | ... | ... |
| | | | | ... | | | | |
| | | | | ... | | | | |
| | | | | Sig 2.n | ... | ... | ... | ... |
| ... | ... | ... | ... | | | | | |
| Msg m | MsgIDm | NodeX | NodeY | Sig m.1 | ... | ... | ... | ... |
| | | | | Sig m.2 | ... | ... | ... | ... |
| | | | | Sig m.3 | ... | ... | ... | ... |
| | | | | Sig m.4 | ... | ... | ... | ... |
| | | | | ... | | | | |
| | | | | ... | | | | |
| | | | | Sig m.n | ... | ... | ... | ... |

Fig. 5

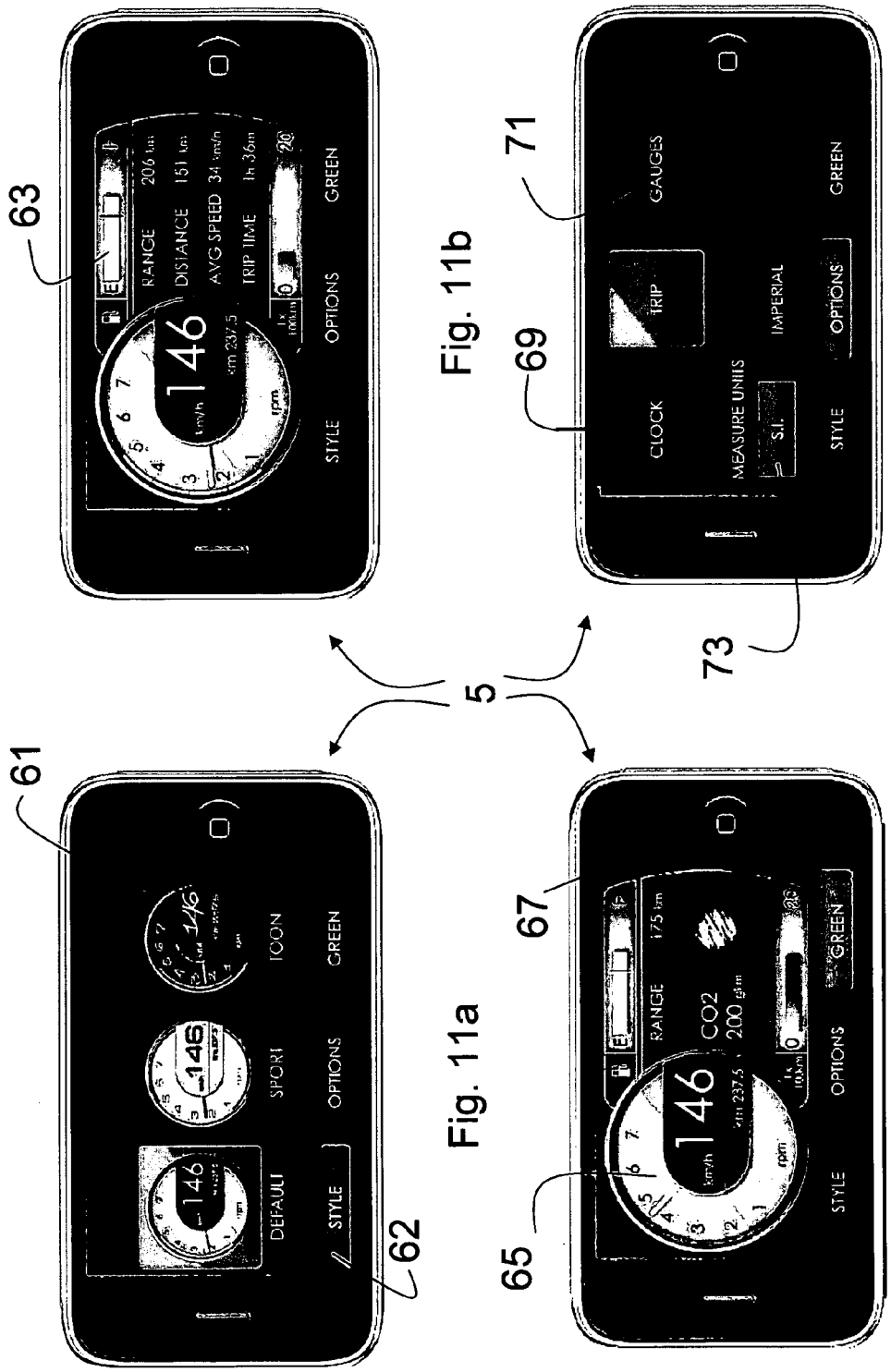

METHOD AND SYSTEM FOR PROCESSING INFORMATION RELATING TO A VEHICLE

BACKGROUND OF THE INVENTION

1. Field of the Invention

The present invention relates to a method and a system for processing information relating to a vehicle.

2. Present State of the Art

As known, modern vehicles, in particular motor vehicles, are equipped with a plurality of electronic control units (ECU) that control different subsystems of the vehicle itself.

The electronic control units are typically connected to one another through a serial data communication bus called CAN (Controller Area Network), which can operate properly even within an environment strongly disturbed by electromagnetic waves.

CAN is an international standard, as documented by ISO 11898 (for high-speed applications) and ISO 11519 (for low-speed applications), based on a database that describes the information present in the vehicle network and handled by the various electronic control units. In order to provide access to the electronic control units, each vehicle may be fitted with a specific connector, e.g. an OBD-I, OBD-II or EOBD connector, or other proprietary connectors as defined by the vehicle manufacturers, where "OBD" stands for "On-Board Diagnostic".

Through the OBD or proprietary connector, qualified technicians like the personnel of car repair shops can interface a specific diagnostic apparatus to the electronic control units of the vehicle in order to read parameters and/or data, reconfigure the electronic control units of the vehicle, and so on.

The information supplied by the diagnostic apparatus is therefore mostly intended for specific use by qualified personnel, typically for diagnostic purposes only.

The CAN network database of a vehicle may be supplied by the car manufacturer only under specific agreements; in any case, this happens very seldom and for specific vehicles only: As an alternative, a costly reverse engineering operation must be carried out in order to rebuild said database.

Generally, only little information can be obtained through a diagnostic connector: in fact, it is generally only possible to obtain, in addition to a number of trouble codes, three signals providing information about vehicle speed, engine rpm and oxygen sensor for exhaust emission assessment purposes.

In the event that the vehicle has no diagnostic connector or that the quantity and quality of the information attainable from the vehicle network are insufficient, it is however still possible to establish a connection to the vehicle network by using appropriate specialised techniques and tools. This practice is widespread among the installers of aftermarket devices, e.g. for installing alarms, parking sensors and insurance black boxes, but it requires the knowledge of that part of the proprietary database which is necessary for interpreting messages intended for a specific application.

However, all of these solutions have drawbacks in terms of time, costs and limitations. In particular, especially in reverse engineering, which is the technique most frequently used by aftermarket accessory manufacturers and installers, customer assistance and incompatibility management costs are very high because it is necessary to maintain a list of vehicles compatible with a certain application without being able to foresee its actual utilisation on new vehicle models.

Such a scenario implies that access to vehicle information is only allowed to qualified personnel, thus giving up a mine of information which could also be used by non-qualified people, e.g. the vehicle user, for all kinds of applications (logging of vehicle performance, fuel consumption and emission data, virtual dashboards, and so on).

It follows that there is a need for allowing any user to exploit such a mine of information whenever he/she uses a vehicle, regardless of the vehicle used by the user.

SUMMARY OF THE INVENTION

It is the main object of the present invention to provide a method and a system for processing information relating to a vehicle so that said information can be obtained from the electronic control units of any kind of vehicle.

It is another object of the present invention to provide a method and a system for processing information relating to a vehicle, in particular to the status thereof, in a customisable manner and for any kind of user.

It is a further object of the present invention to provide a method and a system for processing information relating to a vehicle so as to allow a user having the necessary authorisations to set parameters of a vehicle or of subsystems thereof, while overcoming any in-vehicle installation and integration problems.

It is a further object of the present invention to provide a method and a system for processing information relating to a vehicle on a user's personal device, in particular a nomadic device.

It is a further object of the present invention to provide a method and a system for processing information relating to a vehicle even when the vehicle is being driven.

Finally, it is yet another object of the present invention to provide a method and a system for processing information relating to a vehicle which can supply the user with the requested information in a context-based manner, i.e. based on the vehicle's conditions and/or the user's driving style estimated according to the parameters read from the vehicle network.

In short, the system according to the present invention comprises an electronic control device which interfaces to a vehicle network and a nomadic device, in particular a smartphone, and exchanges data with both the electronic control device and the nomadic device.

Upon installation of the system according to the invention, the electronic control device locates the network of the vehicle in which it has been installed and establishes a dialogue with the nomadic device, which comprises the network database of that specific vehicle. The vehicle is recognised automatically, and the electronic control device begins receiving and/or transmitting information about the vehicle to the nomadic device without any further action by the user.

In a further embodiment of the invention, the vehicle network database is prearranged on a remote server accessible to the nomadic device through a communication network.

The system according to the present invention also describes a virtual dashboard, i.e. an application which can be implemented on a device fitted with a screen, in particular a nomadic device, and which can operate alongside the traditional dashboard of the vehicle while integrating it with new value-added features obtainable from the vehicle's ECUs, such as, for example, status indicators (e.g. brake temperature, tyre pressure, and so on) or driver performance indicators (e.g. lateral and longitudinal acceleration of the vehicle and environmental parameters, such as $CO_2$ emission in the atmosphere). Said features and information are derived directly from the vehicle network through the electronic control device, which can read and control physical signals coming from both the network and the ECUs of the vehicle.

The system according to the present invention also allows a user to interact with the vehicle, e.g. in order to decide which particular piece of information should be displayed on the screen of a device, in particular a nomadic one, so as to customise the virtual dashboard. This context-based information allows to surpass the "priority-type" technology currently being used for providing information to vehicular navigation systems in favour of more recent algorithms and technologies capable of improving driving safety.

The present invention also allows a user to set the parameters of the vehicle's electronic control units through encrypted data exchange, thus preventing unauthorised external access and diversifying the typology of allowed operations.

The different user categories are allowed access to the system with different modalities, e.g. read-only or read-write, and to different information subsets (e.g. all information, engine information only, infotainment application information only, diagnostic operations only, and so on).

According to the present invention, the users may be classified, for example, as drivers and/or passengers, maintenance and diagnosis technicians, dealer and workshop personnel.

The remote server also manages authorisations by means of certificates needed for the cryptographic process.

Certificates are managed through the remote server, which may also send application updates to a display device of the nomadic device. It follows that the remote server provides a service that handles user registrations, updates the software applications of the nomadic device, and is responsible for extending the number of vehicles supported by the application.

In accordance with the present invention, these objects are achieved through a method and a system for processing information relating to a vehicle having the features set out in the appended claims, which are intended as an integral part of the technical teaching of the invention.

BRIEF DESCRIPTION OF THE DRAWINGS

The above objects will become apparent from the detailed description of the method and system according to the invention, with particular reference to the annexed figures, wherein:

FIG. 5 shows a possible structure of a vehicle database;

FIGS. 11a, 11b, 11c, 11d show possible modes of displaying information received from a vehicle network on the screen of a nomadic device.

DETAILED DESCRIPTION OF THE PREFERRED EMBODIMENTS

Figure 1:
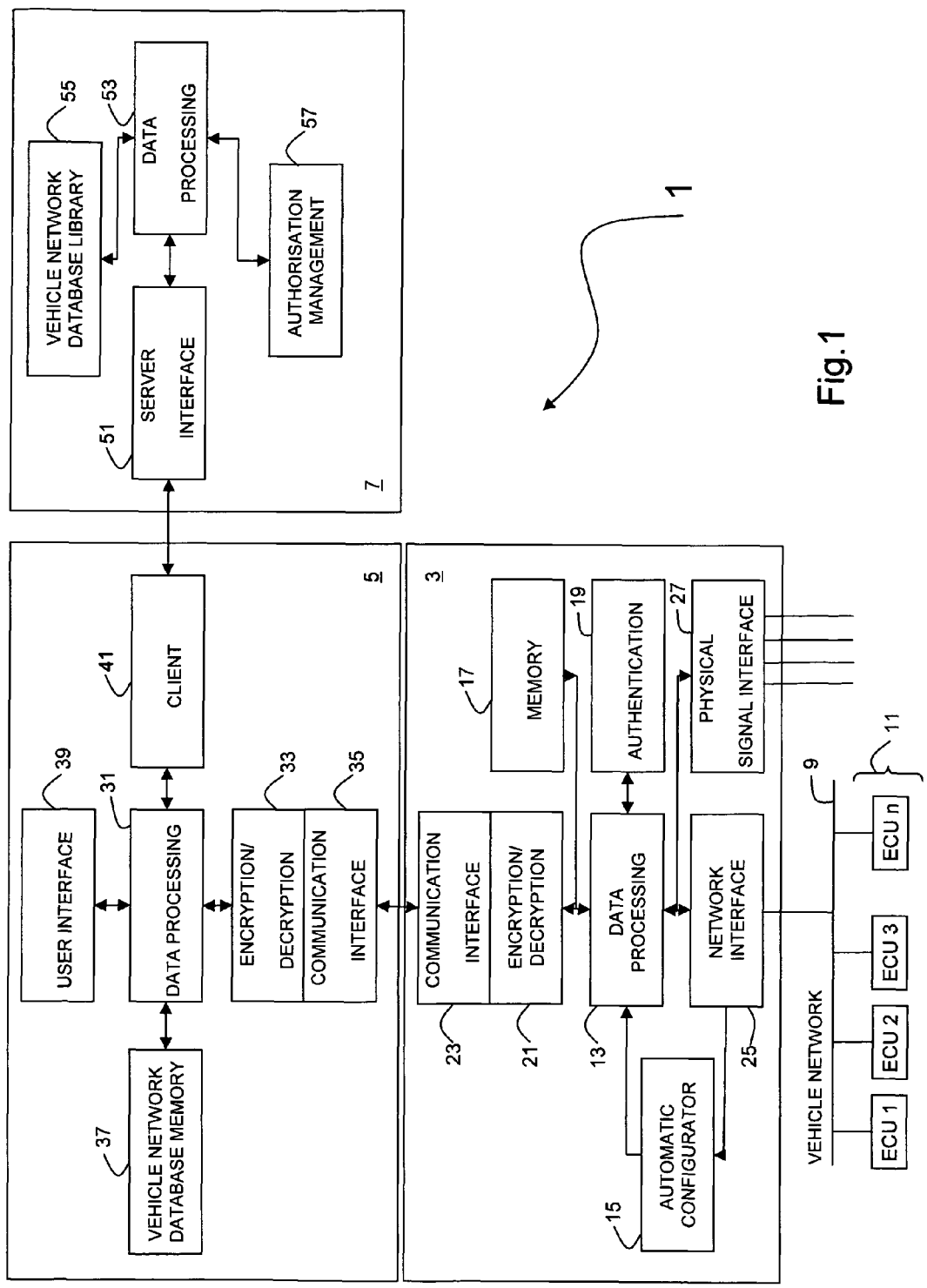
FIG. 1 is a block diagram of a system for processing information relating to a vehicle according to the present invention.

Referring now to FIG. 1, there is shown a system 1 for processing information relating to a vehicle, comprising an electronic control device 3 and a nomadic device 5.

The term "nomadic device" refers to a wireless mobile device, such as a cellular phone, a hand-held computer, a PDA ("Personal Digital Assistant"), a smartphone, a satellite navigation system, a personal computer, a notebook, or a combination of these or other personal devices capable of processing data.

The system 1 may also comprise a remote server 7 interfaced to the nomadic device 5 for exchanging data through a network connection, e.g. GPRS, UMTS, HSDPA, etc.

The electronic control device 3 is a "stand-alone" unit, in particular a printed circuit board, which interfaces to a vehicle network 9 to which a plurality of electronic control units (ECUs) 11 of the vehicle relate.

The electronic control device 3 comprises a series of software and hardware modules:

a data processing module 13, comprising a microprocessor and/or a microcontroller, which coordinates all of the main features of the electronic control device 3 and communicates with all other modules of said device 3;

an automatic configuration module 15, which is a logical block adapted to detect all main parameters of the vehicle network 9 and to store them into a memory 17 of the electronic control device 3;

an authentication module 19, which is a hardware or software module that handles authentication certificates and, depending on the certificate sent by the nomadic device 5, either enables or disables different modes (read-only or read-write) of accessing different information sets (all information, engine information only, infotainment application information only, diagnostic operations only, and so on); it comprises a unique identification number ID1 for the authentication procedure;

an encrypting/decrypting module 21 adapted to transfer data at a high security level; it encrypts the data to be transferred to the nomadic device 5 and decrypts the data received therefrom; the encrypting/decrypting steps are carried out by taking into account both a unique identifier ID2 of the nomadic device 5 and the unique identifier ID1 of the electronic control device 3;

a communication interface 23 for communicating with the nomadic device 5, comprising the electric levels required for adapting to a particular means and protocol of communication, as well as all elements required for data transfer (e.g. a wireless antenna or a wired connector);

a network interface 25, comprising the electric levels and the protocol required for interacting appropriately with the vehicle network 9 (e.g. a wireless antenna or a wired connector);

a physical signal interface 27, which is a signal conditioning unit capable of driving or reading various analog signals (e.g. voltage levels) and digital signals, or driving external devices (e.g. relays, lights, etc.).

In a further embodiment, the control device 3 may be built in an existing element, such as a dashboard, an infotainment control unit, etc., thus becoming an integral part of that element.

In its turn, the nomadic device 5 also comprises a series of software and hardware modules:

a data processing module 31, comprising a microprocessor and/or a microcontroller, which coordinates all of the main features of the nomadic device 5 and communicates with all other modules of said device 5;

an encrypting/decrypting module 33 adapted to transfer data at a high security level; it encrypts the data to be transferred to the electronic control device 3 and decrypts the data received therefrom; the encrypting/decrypting steps are carried out by taking into account both the unique identifier ID2 of the nomadic device 5 and the unique identifier ID1 of the electronic control device 3;

a communication interface 35 for communicating with the electronic control device 3, comprising the electric levels required for adapting to a particular communication means and protocol, as well as all elements required for data transfer (e.g. a wireless antenna);

means 37 for storing a database of the vehicle network 9, which comprises all information required for decoding the data circulating in the vehicle network 9 or corresponding to the input/output interfaces present in the vehicle and connected to the electronic control device 3; the fact that the database 37 is arranged inside the nomadic device 5, not in the electronic control device 3, is advantageous because it is not necessary to gain access to the firmware of the electronic control device 3, but only to update the database in the nomadic device 5;

a user interface module 39, comprising one or more display devices, in particular a screen, and one or more data input devices, e.g. a keyboard, for displaying data received from the vehicle network 9 through the electronic control device 3 and interacting with the nomadic device 5, and consequently with the other system components;

a client 41, which is a logical or hardware block capable of connecting the nomadic device 5 to one or more wireless local or geographic networks, e.g. a WAN ("Wide Area Network") in wireless or wired mode and of exchanging data with the remote server 7, e.g. by using a TCP/IP connection.

In its turn, the remote server 7 comprises:

a server interface 51, which is a logical and physical element that provides an interface between the remote server 7 and one or more wireless local or geographic networks;

a data processing module 53, which is responsible for processing and supervising the main activities of the remote server 7 while supplying authorisations and databases to the nomadic device 5;

a vehicle network database library 55, so that when a nomadic device 5 needs a particular vehicle network database and has the necessary authorisations, the remote server 7 will search for the appropriate database in the vehicle network database library 55; if the requested database is not found in the remote server 7, then a notice will be sent to the server administrator, who will update the database library 55 with the requested database;

an authentication management module 57, which is adapted to keep track of the registered users, nomadic devices 5 and electronic control devices 3, as well as to issue authorisations suited to the nomadic device 5 in order to activate different access levels to the vehicle network 9.

Figure 3:
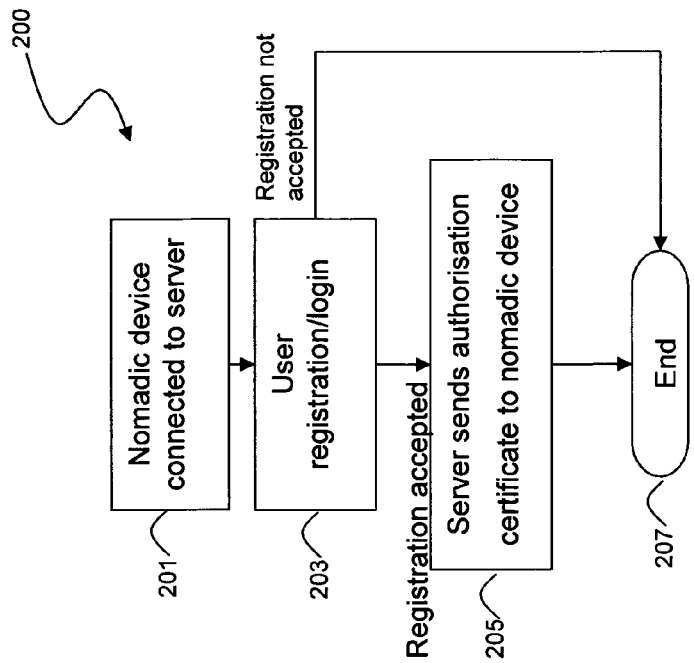
FIGS. 2, 3 and 4 are flow charts which illustrate the procedures required for displaying a plurality of information received from a vehicle network on a screen of a nomadic device or for setting, with appropriate authorisations, parameters of the vehicle or of subsystems thereof.
Figure 2:
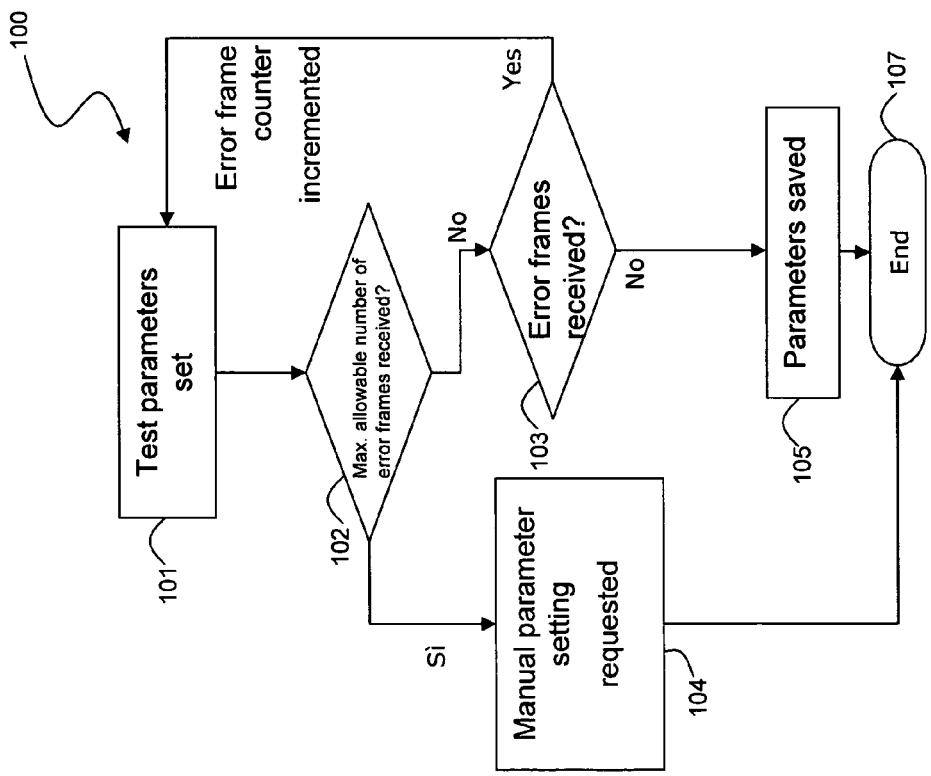
Figure 4:
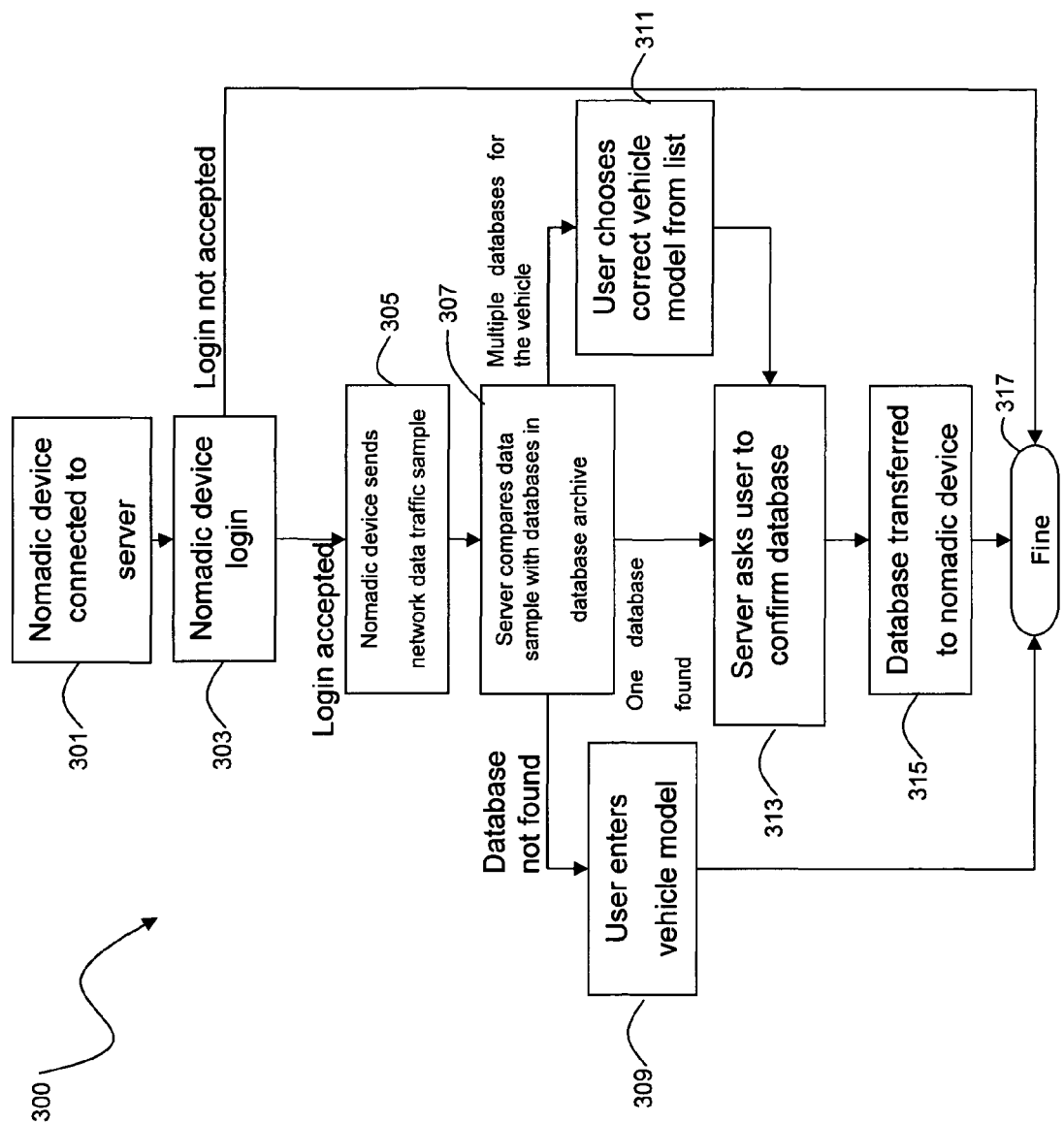

With reference to FIGS. 2, 3 and 4, the following will describe the procedures necessary for displaying a plurality of information received from the vehicle network 9 on a display device of the user interface 39 of the nomadic device 5.

For the nomadic device 5 and the electronic control device 3 to be able to interact with each other, it is at least necessary that the electronic control device 3 configures itself by adapting its own network interface 25 to the vehicle network parameters and that the nomadic device 5 has the vehicle network database available. Said vehicle network database may, for example, be available in an internal memory of the nomadic device 5 or in an external memory, e.g. a flash card, which communicates with the memory 37 of the nomadic device 5.

In a further embodiment of the invention, the nomadic device 5 obtains the vehicle network database from the remote server 7.

In yet another embodiment of the invention, the nomadic device 5 obtains authorisation certificates from the remote server 7.

With reference to FIG. 2, when the electronic control device 3 is switched on for the first time or after a system reset, it can configure itself autonomously by retrieving the vehicle network parameters that allow the data stream to be read correctly. For example, a network parameter is the CAN bit rate or the OBD connector bit rate. Once such parameters have been retrieved, they are stored into the memory 17 of the electronic control device 3. In the event that the automatic configuration is not completed successfully, a manual configuration procedure will be triggered.

The electronic control device 3 advantageously allows the application according to the present invention to be used on a very large number of vehicles without any hardware or software modifications being required.

The automatic configuration procedure 100 starts with a step 101 wherein first test parameters are set and a communication is established with the vehicle network 9. If the previously set maximum number of error frames received is reached (step 102), then a manual setting of the configuration parameters is requested (step 104) and the procedure ends (107). Otherwise, if any error frames are received (step 103, right-hand branch), it means that the first test parameters set in step 101 are wrong; an error frame counter will then be incremented and a further attempt will be made by using second test parameters, thus returning to step 100. If the set parameters are correct, they are stored (step 105) into the memory 17 of the electronic control device 3. The procedure ends at step 107.

Referring to FIG. 3, there is shown a procedure 200 for obtaining authorisation certificates from the remote server 7.

For security reasons, the nomadic device 5 must obtain a correct certificate from the remote server 7 (step 201) in order to complete the authentication step and start an encrypted communication with the electronic control device 3. Therefore, the system user must first register into the service and obtain a user name and a unique password to log in to the service (step 203); the remote server 7 will then send to the nomadic device 5 a certificate (step 205) containing a unique identifier that identifies information at least relating to:

the certificate expiry date;
the authorisation level;
the user data.

The certificate is used for the first authentication between the nomadic device 5 and the electronic control device 3, and together with the unique identifier ID1 of the electronic control device 3 acts as a key for encrypting and decrypting the data.

The remote server 7 can provide the nomadic device 3 with different authorisation levels, depending on the type of user.

It the user name and the password are not recognised by the remote server 7 (right-hand branch of step 203), the procedure 200 will stop (step 207).

Referring to FIG. 4, there is shown a procedure 300 for obtaining the vehicle network database from the remote server 7.

For the purpose of presenting to the user information about the vehicle and the input/output states, the nomadic device 5 must obtain a vehicle network database. With said network database, the nomadic device 5 can interpret the information received from the vehicle and represent it on the display device of the user interface 39 of the nomadic device 5. The vehicle network database describes all the information that can be read or written.

In order to obtain said network database, the nomadic device 5 is connected to the remote server 7 (step 301) and then, following the registration procedure, it receives the specific network database for that vehicle. As an alternative, the network database may already have been stored in the nomadic device 5.

The network database corresponding to the vehicle concerned is retrieved automatically. After logging in to the remote server (step 303), the nomadic device 5 sends to the remote server 7 a sample of the data circulating in the vehicle network 9. The remote server 7 compares this data with the network databases contained in the database archive (step 307), and then it retrieves the network database that matches all data included in the data sample.

If a network database is compatible with all messages circulating in the vehicle network 9, then the application running in the nomadic device 5 will use that network database to decode the messages.

In step 313 the user is requested to issue a confirmation, and in step 315 the network database is transferred to the nomadic device 5 (step 309).

If no compatible database is found, the remote server 7 will store the data sample of the vehicle network 9 previously sent to the remote server 7, and the nomadic device 5 will ask the user to suggest the model of the vehicle on which the electronic control device 3 has been installed (step 309).

The service administrator will use such information to retrieve a new network database that matches the data sample of the vehicle network 9. As soon as the new network database becomes available in the remote server 7, the remote server 7 will automatically send the new network database to all nomadic devices 5 that requested it.

If the remote server 7 finds more than one compatible database, it will ask the user to select from a list that particular vehicle model where the electronic control device 3 has been installed (step 311) and then it will transmit the network database for that vehicle. The procedure 300 ends at step 317.

One possible network database structure is shown in FIG. 5. The network database is formed by a plurality of messages having a unique identification number compliant with the CAN standard and including a data field consisting of signals. Each message of the network database also has at least one transmitter node and one receiver node representing the ECUs 11 of the vehicle. As aforesaid, each message consists of a data field subdivided into signals, which are represented by the following fields:

Name: string indicating a name for the signal in question;
Start bit: numerical value representing that bit of the message data field starting from which the signal value must be read;
Length: represents the length, expressed in bits, of the signal value starting from the start bit;
Offset and scale factor: represent two values for the transformation of the numerical value of the signal prior to its transmission, according to the relation $Y=X*<\text{scale factor}>+<\text{offset}>$, where Y is the physical value of the signal, and X is the value actually transmitted on the network. This relation may then be reversed at reception, so as to obtain the value Y again by knowing X.

The system according to the present invention may be used in many different applications, e.g. entertainment, maintenance, system diagnosis or remote actuation. All of said applications require a high level of security in order to prevent illegal external actions which might damage the electronic control units 11 of the vehicle and, in the worst cases, jeopardise the very safety of the latter.

Therefore, aiming at establishing a secure communication, the proposed invention comprises an authentication procedure for exchanging information between the nomadic device 5 and the electronic control device 3.

Once the authentication procedure has been completed, the data is sent in a manner such that it can only be decrypted if the nomadic device 3 has its own decryption key.

It the nomadic device 5 has the correct authentication certificates, the user is authorised to receive, decode and display all the requested information coming from the vehicle by means of the virtual dashboard.

Several types of users may exist, each having access to a subset of all functions of the nomadic device 5 and of the electronic control device 3. Such types may, for example, be identified as follows:

normal user: this user has the lowest authorisation level, meaning that he is only allowed access to a limited subset of functions; for example, a normal user can only read some data of the vehicle network 9 relating to entertainment or physical signals;
expert maintenance user: this user is allowed access to a wider data set and can carry out diagnostic activities and transmit data on the vehicle network 9;
OEM ("Original Equipment Manufacturer"): this user is allowed access to all data of the vehicle network as well as to all physical signals;
device distributor: this user has full control over the functionalities of the system, and can modify all internal settings of the electronic control device 3.

The user type is assigned by the remote server 7 when the nomadic device 5 gains access to it for the first time. The remote server 7 may also issue time-limited authorisations.

The system 1 includes different authorisation levels that enable or disable the services available on the nomadic device 5. For example, for entertainment purposes the nomadic device 5 is only allowed to receive data, whereas for diagnostic purposes the nomadic device 5 can read and write data.

The authentication procedure can be carried out with the aid of an additional coprocessor (not shown), which generates appropriate certificates and verifies the certificate of the nomadic device 5. If the certificates are wrong, the electronic control device 3 will stop the communication and the nomadic device 5 will no longer be able to communicate with it.

Figure 6:
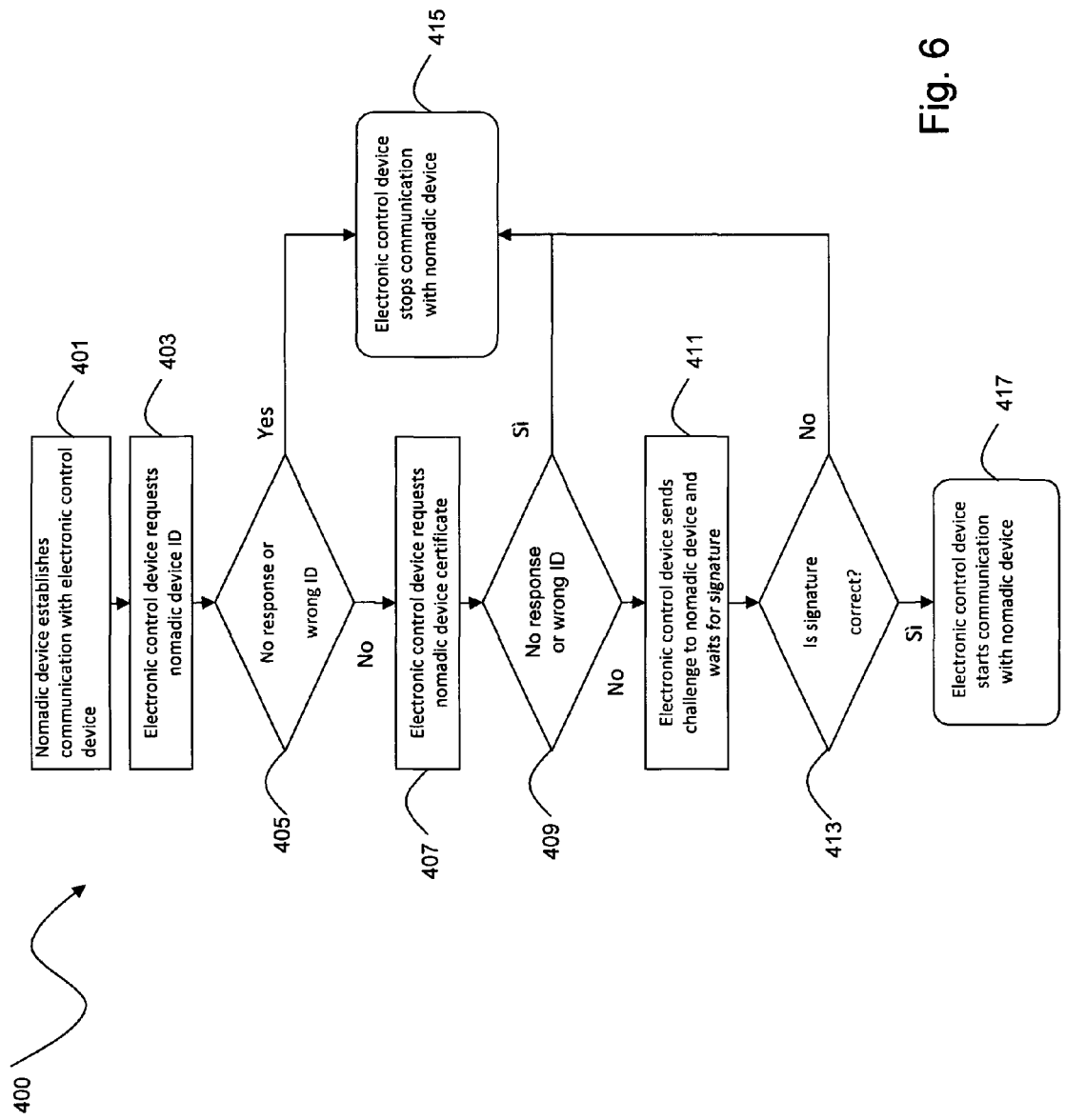
FIG. 6 is a flow chart of an authentication procedure carried out between the nomadic device and an electronic control device communicating with the vehicle network.

The authentication procedure 400 will now be described with reference to FIG. 6.

In step 401 the nomadic device 5 establishes a communication with the electronic control device 3 of the vehicle.

In step 403 the electronic control device 3 of the vehicle asks the nomadic device 5 to provide its own identifier ID2.

In step 405 it is verified if the identifier ID2 of the nomadic device 5 is wrong or if no response has been given by the nomadic device 5; in such cases, the electronic control device 3 will stop the communication with the nomadic device 5 (step 415).

If not, in step 407 the electronic control device 3 asks the nomadic device 5 to provide the certificate.

In step 409 it is verified if the certificate provided by the nomadic device 5 is wrong or if no response has been given by the nomadic device 5; in such cases, the electronic control device 3 will stop the communication with the nomadic device 5 (step 415).

If not, in step 411 the electronic control device 3 sends a challenge to the nomadic device 5 and waits for a signature from the nomadic device 5. If the signature is not correct, the electronic control device 3 will stop the communication with the nomadic device 5 (step 413); otherwise, the procedure 400 will have been completed successfully and the electronic control device 3 will start a communication session with the nomadic device 5 (step 417).

When the authentication procedure is complete, the nomadic device 5 and the electronic control device 3 begin communicating with each other by using a secure protocol which takes into account previous shared certificates. Since the electronic control device 3 and the nomadic device 5 have respective unique identifiers ID1, ID2, the transmitted data can only be decrypted by them.

Figure 7:
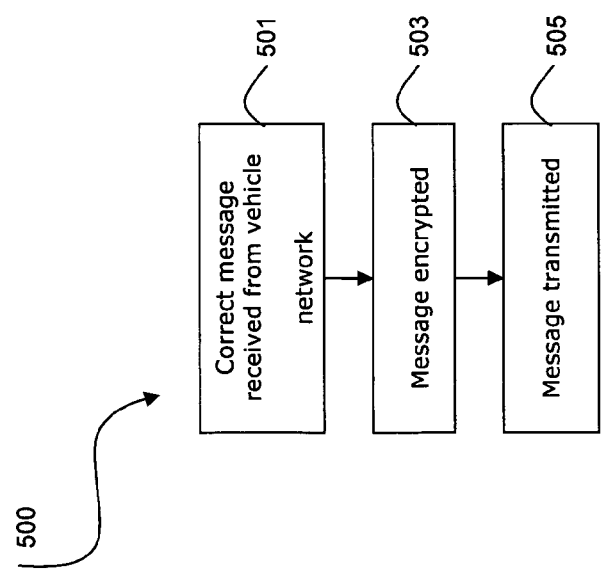

For example, if the electronic control device 3 receives a message from the vehicle network 9 that must be transmitted to the nomadic device 5, it will start the procedure 500 described with reference to FIG. 7 before sending the data: the correct message is received from the vehicle network 9 (step 501), then the message is encrypted (step 503) and sent (step 505).

Figure 8:
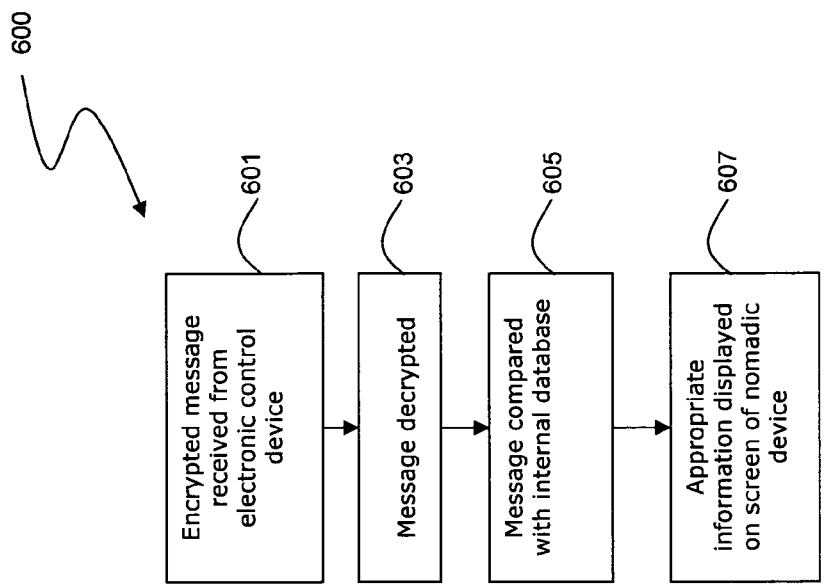
FIGS. 7 and 8 show procedures for encrypting and decrypting data exchanged within the system.

With reference to FIG. 8, which describes the procedure 600, when the nomadic device 5 receives an encrypted message (step 601), it will decrypt it (step 603) and compare it with its own internal database (step 605), and then it will display the appropriate information on the user interface 39 of the nomadic device 5 (step 607).

Depending on his/her authorisation level, the user may interact with the electronic control device 3 in different ways:
 by reading one information subset only;
 by reading all information received from the network;
 by reading and writing data from/to the network;
 by using an additional access right for reading/writing physical signals.

The system according to the present invention allows the user, through the physical signal interface 27 of the electronic control device 3, to drive various physical signals, e.g. analog and digital outputs, and to receive real-time information about the input state of the physical signals, if the nomadic device 5 has a sufficient authorisation level. If the nomadic device 5 has appropriate authorisations, it can both change the state of the physical signals and send the data to the vehicle network. For example, the nomadic device can turn on/off the digital outputs or select a reference or an analog output. It can also inject a data stream into the vehicle network 9 for diagnostic purposes or for changing the state of any electronic control unit 11 of the vehicle, and possibly also for driving the vehicle itself.

Figure 9:
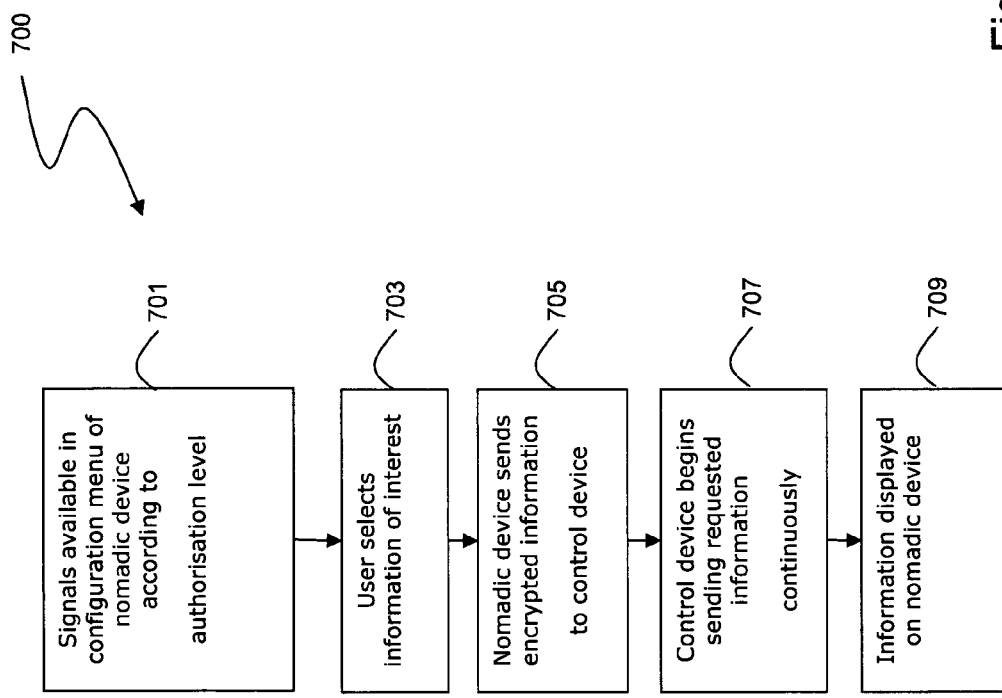
FIG. 9 shows a procedure for indicating to the nomadic device which information is to be made available based on user type.

With reference to FIG. 9, the following will describe a procedure 700 for indicating to the nomadic device 5 what information is to be made available according to the user type.

Through a specific configuration menu, the user selects the information that the nomadic device 5 must make available. The configuration menu only allows the selection of that information for which the user has been authorised (step 701). Once the necessary information has been selected (step 703), the nomadic device 5 sends the configuration data to the electronic control device 3 (step 705), which from that moment onwards will only send that information to the nomadic device 5 (step 707). The information displayed on the nomadic device 5 is automatically adapted, in terms of both graphics and contents, to the type of data received (step 709).

The data transfer between the nomadic device 5 and the electronic control device 3 may take place through a wired or wireless connection, whereas the connection between the nomadic device 5 and the remote server 7 may be obtained through any kind of wired or wireless connection.

The information stream may be of the "push" or "pull" type. For example, the remote server 7 may establish a "push" type communication with the nomadic device 5 when an update is available, e.g. for the virtual dashboard application. Likewise, the nomadic device 5 may establish a "pull" type communication with the remote server 7 when it is connected to a new vehicle through the electronic control device 3, in order to request the information necessary for its own initialisation.

Whatever the connection type, the interaction with the vehicle's internal information is protected by high levels of security because, following an initial authentication step, the transferred data is encrypted and then the received data is decrypted. Therefore, the present invention allows OEMs, for example, to avoid using diagnostic connectors to provide access to the vehicle network, thus preventing any undesired external modifications of important data of the vehicle.

Finally, a nomadic device 5 may contain multiple certificates, so as to allow simultaneous access to and interaction with multiple electronic control devices 3, thus implementing some sort of vehicle fleet management.

Figure 10:
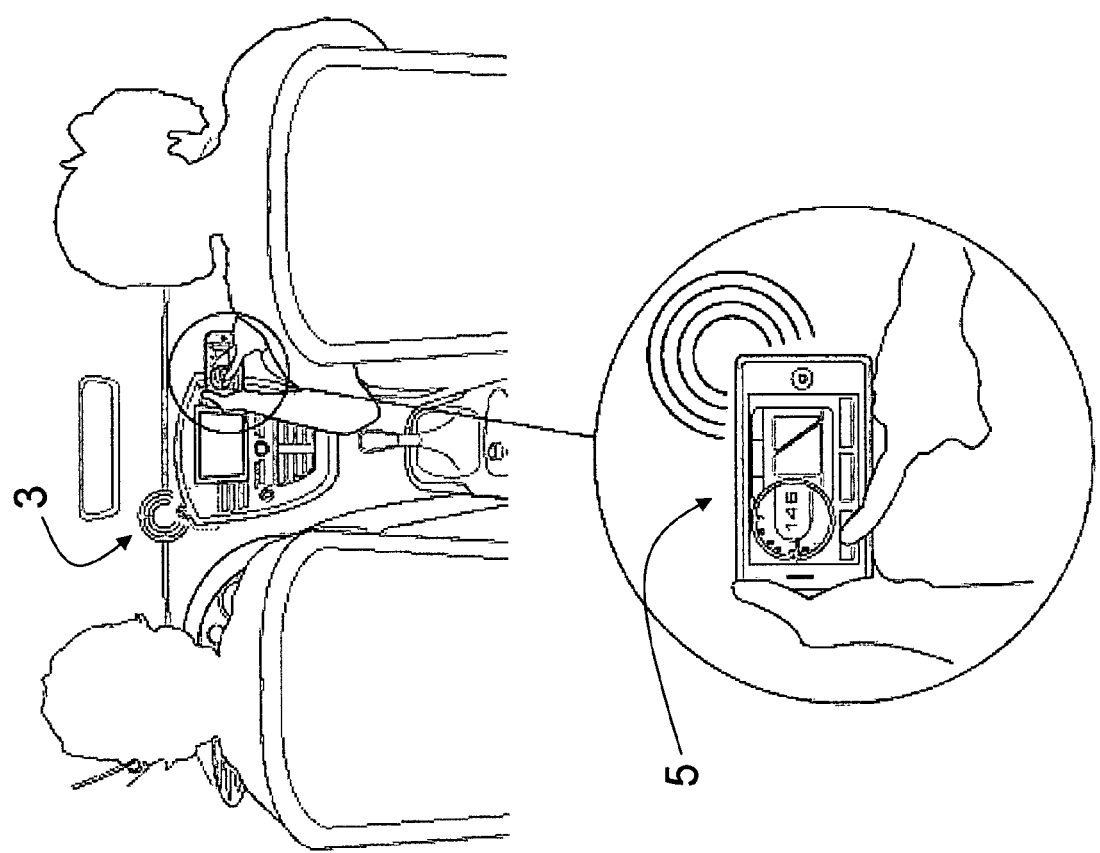
FIG. 10 shows a typical situation of use of the system according to the invention.

Referring now to FIG. 10, there is shown a typical situation of use of the system according to the invention, in which a driver and a passenger are inside the passenger compartment of a vehicle.

The passenger is holding a nomadic device 5, the user interface 39 of which displays vehicle-related information received from the electronic control device 3 in wireless mode.

Possible representations of the user interface 39 of the nomadic device 5 are shown in FIGS. 11a-11d. Such representations are obviously only provided by way of example, since the functionalities of the application implemented in the nomadic device 5 may be innumerable.

The program, or computer product, that at least allows for interfacing with the control device 3 and the remote server 7, processing the physical signals received from the ECUs 11 of the vehicle, and displaying and processing the information on the display device of the user interface 39 of the nomadic device 5 can be loaded into a memory unit of the nomadic device 5.

The examples of FIGS. 11a-11d show several types of screenshots displayed on a nomadic device 5, e.g. an iPhone with a touch screen.

In FIG. 11a the user, by selecting the screen area defined by the text "Style" 62, can choose from three different types of virtual dashboard 61.

For instance, when the "default" style is selected, the configuration of FIG. 11b will be presented which includes, for example, a fuel gauge 63, a tachometer 64, a consumption indicator 65 and some information 66 about the trip being made.

With reference to FIG. 11c, after selecting the screen area marked by the text "Green", the screen will display information about the quantity of $CO_2$ emitted into the atmosphere by the vehicle. For example, the greener is a tree 67, the more virtuous is the driving style from an environmental viewpoint.

The user may also select and display real-time information relating to the actual performance levels of the vehicle.

With reference to FIG. 11d, a configuration screen allows to select a clock 69 or several status indicators 71 or the system of units of measure 73 to be displayed on the screen of the nomadic device 5.

It is also conceivable to provide multiple screens which can be browsed in succession. For each page displayed, the electronic control device 3 will only send to the nomadic device 5 that data which is to be displayed on a specific screen.

A further application of this system may regard the signalling of possible malfunctions of the vehicle to the user through the nomadic device 5, wherein the user is requested to decide what action is to be taken. For example, in the event of a failure or malfunction of the vehicle signalled by one or more ECUs 11, the control device 3 may send to the nomadic device 5 a piece of information comprising a specific warning, and ask the user permission to directly contact the customer service or the remote server 7 and send thereto the data traffic generated by the vehicle network 9.

In a preferred embodiment of the invention, when a malfunction or failure message is issued a call is automatically made through the nomadic device 5 to a service centre in addition to sending the data traffic relating to said malfunction, whereas in the event of an accident an emergency call is made directly to default telephone numbers or to telephone numbers set beforehand in the system by the user.

The accident is detected by the system 1 upon reception by the nomadic device 5 of specific signals from the network, such as a message indicating that one or more airbags have deployed.

Furthermore, since the electronic control device 3 has the capability of configuring itself and recognising the vehicle, it is conceivable that the user interface 39 of the application running in the nomadic device can be reconfigured based on the information available and/or on the peculiarities of some vehicles and/or on the particular conditions of the vehicle and/or on the driving style and the driver's cognitional effort at a certain instant. Interface reconfiguration allows to apply the latest studies about man-machine interaction in the automotive field, according to which a context-based interaction is made possible on the basis of the features of the vehicle and the parameters detected therefrom (speed, rpm, fuel consumption), of the information received from sensors of the nomadic device (GPS, accelerometers, gyroscope, light sensor, etc.) and of the information received in real time from the Internet (traffic, news and many other contents).

The features of the present invention, as well as the advantages thereof, are apparent from the above description.

A first advantage of the present invention is due to the fact that, thanks to the automatic configuration procedure, the system of the present invention can be used on virtually any vehicle without needing hardware or software changes to the electronic parts of the vehicle itself. The automatic configuration of the system is such that the intelligence of the latter strongly converges towards the nomadic device, since the electronic control device only has to adapt itself to the vehicle network.

It is therefore possible to use very simple control units, which can be installed in any vehicle, whether equipped or not with CAN communication capability, without requiring any changes to the communication network.

Thanks to the automatic configuration feature, customer assistance problems are significantly reduced, and it is possible to attain a perfect alignment between the service offered and the vehicles actually used. Moreover, the automatic configuration of the electronic control device allows to minimise the inventory thereof because only one version of the control device is needed, which can then be adapted to the great majority of vehicles, thus reducing the time to market.

A second advantage of the present invention is given by the fact that the information about the status of the vehicle is shown, for any interaction which may be considered appropriate, on the screen of a nomadic device, i.e. a device available to a potentially unlimited number of users.

A third advantage of the present invention is that, thanks to appropriate authorisation levels, only certain types of users are allowed access to the most sensible data circulating in the vehicle network.

A further advantage of the present invention is given by the fact that, thanks to a wireless connection between the electronic control device and the nomadic device, the information from the vehicle can be suitably exploited even when the vehicle is being driven. The electronic control device can be transported from one vehicle to another in a simple and absolutely transparent manner, without the electronic control device having to be reprogrammed with costly procedures requiring special and expensive equipment such as, for example, a control unit programmer.

A further advantage of the present invention is that it can be used in numerous fields of application, such as, for example, entertainment, maintenance, system diagnosis or remote actuation.

Thanks to the client-server architecture, which makes it easier to gain access to the system according to the invention, advantages are obtained in terms of flexibility and ease of implementation of local system updates.

Yet another advantage of the system according to the invention is that the vehicle network databases stored in the remote server are constantly updated and are managed in a centralised, as opposed to distributed, manner, so that the distributors of an aftermarket product can easily automate their process and significantly cut down management and customer service costs.

Furthermore, in the event that a vehicle is not recognised, the procedure allows to make a cost/benefit calculation in real time based on the requests for a new vehicle's network database, and to activate the reverse engineering procedures for a vehicle's CAN database only when a critical mass of requests is reached which justifies the costs.

The method and system for processing information relating to a vehicle described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described method and system for processing information relating to a vehicle, but may be subject to many modifications, improvements or replacements of equivalent parts and elements without departing from the novelty spirit of the inventive idea, as clearly specified in the following claims.

The invention claimed is:

1. A system for processing information relating to a vehicle that includes one or more electronic control units which can be connected to one another through a vehicle network, said system comprising:
an electronic control device adapted to interface to and exchange data with said vehicle network;

a nomadic device adapted to exchange data with said electronic control device; and memory means associated to said nomadic device for storing a network database of said vehicle network, said network database comprising information required for the nomadic device to properly interpret data circulating in said vehicle network and exchanged with said electronic control device and said nomadic device.

2. The system according to claim 1, wherein said network database is formed by a plurality of messages having a unique identification number compliant with a CAN standard and including a data field consisting of information related to signals able to be interpreted by said vehicle network.

3. The system according to claim 1, wherein said electronic control device comprises an automatic configuration module adapted to automatically detect parameters of said vehicle network so as to retrieve said network database of said vehicle.

4. The system according to claim 3, wherein said nomadic device comprises means for transmitting said parameters to a remote server adapted to exchange data with said nomadic device through a communication network, said remote server comprising a data processing module adapted to analyse said parameters in order to retrieve said network database of said vehicle from a network database library and means for transmitting to said nomadic device said network database.

5. The system according to claim 4, wherein said remote server further comprises an authentication management module for managing the authorisation levels required for gaining access to said electronic control units through said nomadic device.

6. The system according to claim 1, wherein said nomadic device and said electronic control device comprise respective encrypting/decrypting modules which allow them to exchange data in an encrypted manner.

7. The system according to claim 1, wherein said nomadic device comprises a user interface on which data received from said electronic control units can be represented in a user-defined manner.

8. The system according to claim 1, wherein said electronic control device comprises a physical signal interface adapted to drive physical signals of said electronic control units through said nomadic device and to receive real-time information about the input state of said physical signals.

9. The system according to claim 1, wherein said electronic control device comprises an electronic card which can be installed in said vehicle for interfacing to said vehicle network.

10. The system according to claim 1, wherein said electronic control device can be integrated with an existing element of said vehicle, in particular an instrument panel or an infotainment control unit, thus becoming an integral part of said element.

11. The system according to claim 1, wherein said control device comprises a graphic interface which is reconfigured on the basis of the vehicle network parameters of said vehicle, of information received from sensors of said nomadic device, and of information received in real time.

12. A method for processing information relating to a vehicle that includes one or more electronic control units which can be connected to one another through a vehicle network, said method comprising the steps of:

prearranging an electronic control device adapted to interface to and exchange data with said vehicle network;

prearranging a nomadic device adapted to exchange data with said electronic control device, and associating memory means to said nomadic device for storing a network database of said vehicle network, said network database comprising information required for properly interpreting data circulating in said vehicle network and exchanged with said electronic control device and said nomadic device.

13. The method according to claim 12, wherein said electronic control device is adapted to automatically detect parameters of said vehicle network so as to retrieve said network database of said vehicle.

14. The method according to claim 13, wherein said nomadic device transmits said parameters to a remote server adapted to exchange data with said nomadic device through a communication network, said remote server analyses said parameters in order to retrieve said network database of said vehicle from a network database library and transmits said network database to said nomadic device.

15. The method according to claim 14, wherein, if said network database is not included in said network database library, a notice is sent to the administrator of said remote server.

16. The method according to claim 15, wherein if signals coming from said electronic control units comprise information about a malfunction of at least one of said electronic control units of said vehicle, an information comprising a specific warning can be displayed on said nomadic device.

17. The method according to claim 16, wherein a service call is automatically made through the nomadic device to the remote server or to a service centre, during which call the data traffic generated by the vehicle network in relation to said malfunction is sent as well.

18. The method according to claim 16, wherein, in the event of an accident, an emergency call is automatically made through the nomadic device to default emergency telephone numbers or to telephone numbers set beforehand by the user in the nomadic device, said accident being detected upon reception by the nomadic device of specific signals from the vehicle network, such as, for example, a message indicating that one or more airbags have deployed.

19. The method according to claim 14, wherein said remote server, when an update is available, establishes a "push" type communication with said nomadic device, and/or said nomadic device, when it is connected to a new vehicle, establishes a "pull" type communication with said remote server through the electronic control device.

20. The method according to claim 15, wherein said remote server, when an update is available, establishes a "push" type communication with said nomadic device, and/or said nomadic device, when it is connected to a new vehicle, establishes a "pull" type communication with said remote server through the electronic control device.

21. A computer product which can be loaded into the memory of a nomadic device for processing information relating to a vehicle comprising one or more electronic control units which can be connected to one another through a vehicle network, said computer product comprising software code portions for implementing the method according to claim 12 when the computer product is executed in said nomadic device.

* * * * *